(12) United States Patent
Harishankar et al.

(10) Patent No.: US 11,567,760 B2
(45) Date of Patent: Jan. 31, 2023

(54) TRANSFORMING SELECT PORTIONS OF A MONOLITHIC APPLICATION TO MICROSERVICES

(71) Applicant: INTERNATIONAL BUSINESS MACHINES CORPORATION, Armonk, NY (US)

(72) Inventors: Raman Harishankar, Blacklick, OH (US); Ram Ravishankar, Irvine, CA (US); Sandeep Sukhija, Sri Ganganagar (IN); Harish Bharti, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 16/801,610

(22) Filed: Feb. 26, 2020

(65) Prior Publication Data

US 2021/0263735 A1 Aug. 26, 2021

(51) Int. Cl.
*G06F 8/76* (2018.01)
*G06F 9/445* (2018.01)
(Continued)

(52) U.S. Cl.
CPC ............... *G06F 8/76* (2013.01); *G06F 8/36* (2013.01); *G06F 8/65* (2013.01); *G06F 9/44505* (2013.01)

(58) Field of Classification Search
None
See application file for complete search history.

(56) References Cited

U.S. PATENT DOCUMENTS 10,146,792 B1 * 12/2018 Dobrek ............. G06Q 20/0655
2019/0108067 A1 * 4/2019 Ishikawa ................ H04L 41/50
(Continued)

FOREIGN PATENT DOCUMENTS

| CN | 104636333 | 5/2015 |
| CN | 102981823 | 9/2015 |
| WO | 2018197928 | 11/2018 |

OTHER PUBLICATIONS

Francesco et al., "Migrating towards Microservice Architectures: an Industrial Survey," IEEE, 2018, 10pg. (Year: 2018).*
Guelen, Jan Pieter, "Informed CQRS design with continuous performance testing," Utrecht University, 2015, 107pg. (Year: 2015).*
(Continued)

*Primary Examiner* — Ryan D. Coyer
(74) *Attorney, Agent, or Firm* — Scott Dobson; Andrew D. Wright; Calderon Safran & Cole, P.C.

(57) ABSTRACT

A method includes: determining, by a computing device, transactions of a monolithic application; ranking, by the computing device, the transactions using predefined rules; selecting, by the computing device, a candidate transaction from the ranked list; determining, by the computing device, lines of application code of the monolithic application associated with the candidate transaction; mapping, by the computing device, respective ones of the determined lines of application code to a first operation and a second operation, wherein the first operation and the second operation are different types of operation; and defining, by the computing device, a target state design based on CQRS (Command Query Responsibility Segregation), the target state design including a first microservice that performs the first operation and a second microservice that performs the second operation.

20 Claims, 7 Drawing Sheets

(51) Int. Cl.
*G06F 8/36* (2018.01)
*G06F 8/65* (2018.01)

(56) References Cited

U.S. PATENT DOCUMENTS

| | | | |
|---|---|---|---|
| 2019/0171433 A1 | 6/2019 | Groseclose et al. | |
| 2019/0250912 A1* | 8/2019 | Gavisiddappa Kodigenahalli | G06F 8/20 |
| 2020/0019388 A1* | 1/2020 | Jaeger | G06F 9/5077 |
| 2020/0294128 A1* | 9/2020 | Celia | H04L 9/0637 |
| 2021/0011688 A1* | 1/2021 | Sasidharan | G06F 8/30 |
| 2021/0124576 A1* | 4/2021 | Gungabeesoon | G06F 11/3692 |

OTHER PUBLICATIONS

Kabbedijk et al., "A Case Study of the Variability Consequences of the CQRS Pattern in Online Business Software," ACM, 2010, 10pg.(Year: 2010).*

Knoche, Holger, "Sustaining Runtime Performance while Incrementally Modernizing Transactional Monolithic Software towards Microservices," ACM, 2016, 4pg. (Year: 2016).*

Mazlami et al., "Extraction of Microservices from Monolithic Software Architectures," IEEE, 2017, 8pg. (Year: 2017).*

Pacheco, Vinicius Feitosa, "Microservice Patterns and Best Practices : Explore Patterns Like CQRS and Event Sourcing to Create Scalable, Maintainable, and Testable Microservices," Packt Publishing, 2018, 357pg. (Year: 2018).*

Petrasch et al., "Transformation of State Machines for a Microservice-Based Event-Driven Architecture: A Proof-of-Concept," Springer, 2019, 11 pg. (Year: 2019).*

Kabbedijk et all., "A Case Study of the Variability Consequences of the CQRS Pattern in Online Business Software", Utrecht University, May 2010, 10 pages.

Zhong et al., "Using Event Sourcing and CQRS to Build a High Performance Point Trading System", 2019 Association for Computing Machinery, Feb. 25-28, 2019, 4 pages.

Dehghani, "How to break a Monolith into Microservices", https://martinfowler.com/articles/break-monolith-into-microservices.html, Apr. 24, 2018, 16 pages.

IBM, "Introducing ASMPUT", https://www.ibm.com/support/knowledgecenter/en/SSLTBW_2.1.0/com.ibm.zos.v2r1.asmk200/putintr.html, HLASM Toolkit Feature User's Guide, IBM Corporation 1990, 2014, 2 pages.

Kharenko, "Monolithic vs. Microservices Architecture", Monolithic Architecture, https://articles.microservices.com/monolithic-vs-microservices-architecture-5c4848858f59, Oct. 9, 2015, 6 pages.

Buhler et al., "Turning Data into Insight with IBM Machine Learning for z/OS", International Technical Support Organization, Aug. 2018, 202 pages.

Dinh, "An Overview of Microservices Architecture", http://khoadinh.github.io/2015/05/01/microservices-architecture-overview.html. May 1, 2015, 6 pages.

Fowler, "CQRS", https://martinfowler.com/bliki/CQRS.html, Jul. 24, 2011, 5 pages.

Stasch, "CQRS—Simple Architecture", https://www.future-processing.pl/blog/cqrs-simple-architecture/, Kariera Future Processing, accessed Feb. 24, 2020, 9 pages.

Anonymous, Pattern: Command Query Responsibility Segregation (CQRS), https://microservices.io/patterns/data/cqrs.html, accessed Feb. 24, 2020, 3 pages.

* cited by examiner

TRANSFORMING SELECT PORTIONS OF A MONOLITHIC APPLICATION TO MICROSERVICES

BACKGROUND

Aspects of the present invention relate generally to computing devices and, more particularly, to transforming select portions of a monolithic application to microservices.

A monolithic application is a single-tiered software application in which the user interface and data access code are combined into a single program from a single platform. Microservices architecture is a methodology that breaks up a software application into plural different services (e.g., microservices) that each perform a very specific process of the application.

SUMMARY

In a first aspect of the invention, there is a method including: determining, by a computing device, transactions of a monolithic application; ranking, by the computing device, the transactions using predefined rules; selecting, by the computing device, a candidate transaction from the ranked list; determining, by the computing device, lines of application code of the monolithic application associated with the candidate transaction; mapping, by the computing device, respective ones of the determined lines of application code to a first operation and a second operation, wherein the first operation and the second operation are different types of operation; and defining, by the computing device, a target state design based on CQRS (Command Query Responsibility Segregation), the target state design including a first microservice that performs the first operation and a second microservice that performs the second operation.

In another aspect of the invention, there is a computer program product comprising one or more computer readable storage media having program instructions collectively stored on the one or more computer readable storage media, the program instructions executable to: determine transactions of a monolithic application; rank the transactions using predefined rules; select a candidate transaction from the ranked list; determine lines of application code of the monolithic application associated with the candidate transaction; map respective ones of the determined lines of application code to a first operation and a second operation, wherein the first operation and the second operation are different types of operation; and define a target state design including a first microservice that performs the first operation and a second microservice that performs the second operation.

In another aspect of the invention, there is system including a processor, a computer readable memory, one or more computer readable storage media, and program instructions collectively stored on the one or more computer readable storage media. The program instructions are executable by the processor via the computer readable memory to: determine transactions of a monolithic application; rank the transactions using predefined rules; select a candidate transaction from the ranked list; determine lines of application code of the monolithic application associated with the candidate transaction; map respective ones of the determined lines of application code to a first operation and a second operation, wherein the first operation and the second operation are different types of operation; and define a target state design including a first microservice that performs the first operation and a second microservice that performs the second operation, wherein the determining the lines of application code comprises: determining a primary token; and determining at least one secondary token based on the primary token.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
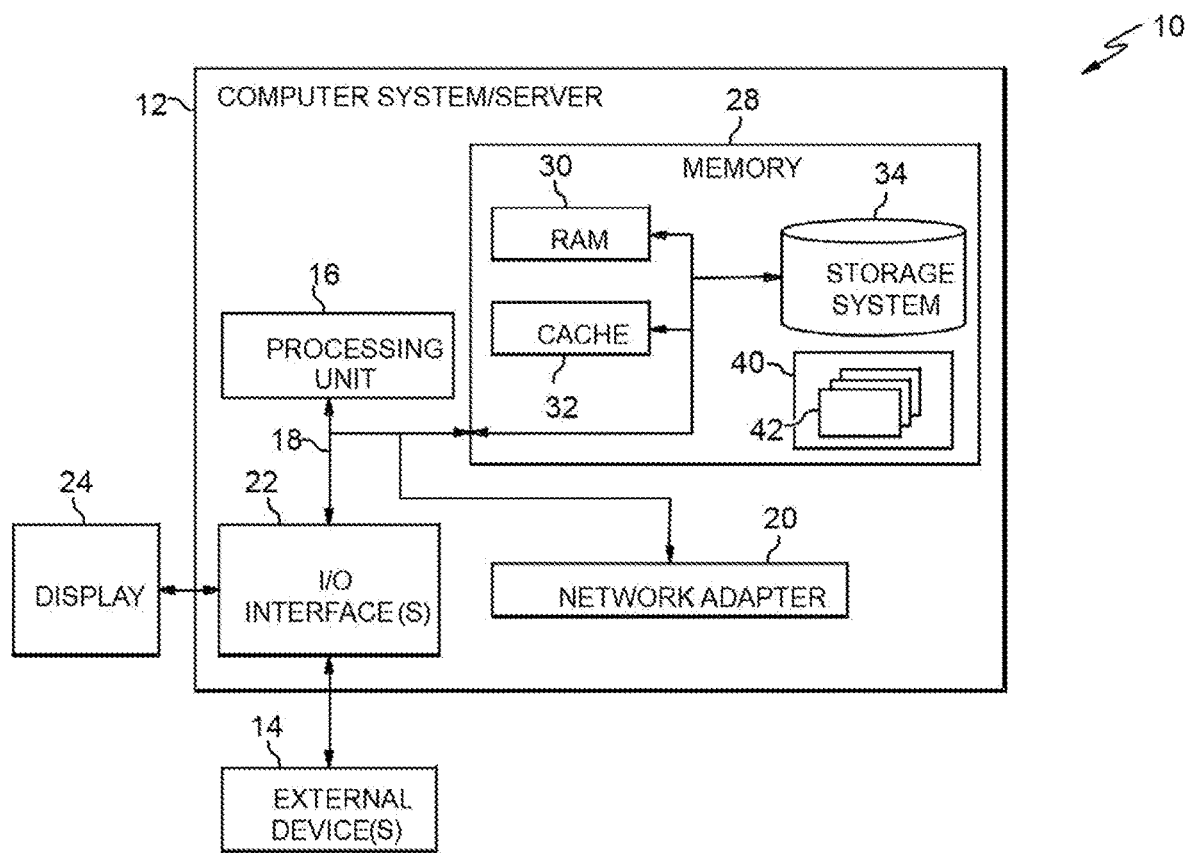
FIG. 1 depicts a computer infrastructure according to an embodiment of the present invention.

Aspects of the present invention relate generally to computing devices and, more particularly, to transforming select portions of a monolithic application to microservices. Embodiments of the invention provide for transforming certain transactions performed by the monolithic application into microservices. In accordance with aspects of the invention described herein, a system is configured to identify plural different transactions that are performed by a monolithic application, rank these transactions using pre-defined rules, and transform one or more of the highest ranking transactions into microservices by isolating and decoupling the individual transactions from the monolithic application and refactoring them into microservice applications. In this manner, implementations of the invention provide a targeted process of transforming a subset of all the transactions performed by the monolithic application, the subset being determined based on predefined rules that rank transactions according to configurable criteria.

Many organizations with a digital transformation focus are moving from monolithic application architecture to microservices architecture. Complex monolithic applications typically have thousands of lines code containing business logic that has been incrementally developed over several years. With so many lines of code in a legacy monolithic application, and with so many different transactions performed by the monolithic application, it is often not feasible to convert the entire monolithic application to microservices at one time. Moreover, it is very difficult to identify the top priority transactions of the monolithic application that are the best candidates for conversion to microservices.

An even more complex problem is how to intelligently identify and decouple key business transactions (which are buried in to thousands of lines of code of the monolithic application) and move them into microservice based applications without missing key business logic associated to the transaction. For example, monolithic applications often contain complex business logic with no well-defined structure, such that it is difficult to identify what part of the application functionality should be isolated first and refactored (e.g., with maximum business impact and incremental business value). As a result, identifying the optimal vertical slices of transaction code is difficult, highly manual and inefficient. Another complex problem is found in identifying prioritized migration and refactoring of application transactions to microservices architecture such that business value is maximized. Moreover, the manual designing of a target microservice that caters to an identified vertical slice of a business function of the monolithic application is inefficient, e.g., since such manual processes are unable to identify correct set of business rules and/or logic that are hidden in the thousands of lines of the monolithic application.

Implementations of the invention address these problems by leveraging CQRS (Command Query Responsibility Segregation) principles in determining which transactions of a monolithic application to transform into microservices. Using CQRS principles allows embodiments to isolate the read (R) flow from the create/update/delete (C/U/D) flows, thus brining direct benefit in terms of increased availability, performance, and resiliency. Implementations of the invention cognitively identify optimum vertical slices for CQRS enablement, identify exact application components and specific lines of source code of the existing system of record to be refactored, and provide an optimum design for a target microservice that will cater to the identified vertical slice of the business function.

Embodiments of the invention provide a method and framework to analyze a monolithic application and define a microservices architecture based on a target state along with required business logic that goes into each microservice. Implementations of the invention isolate and decouple individual transactions from the monolithic application in to refactored microservice applications. In aspects, embodiments also provide a prioritized ranking of transactions based on business value that the transformation to microservices will deliver.

As described herein, implementations of the invention provide for analyzing a monolithic application to identify transactions that are ideal candidates for CQRS based microservice transformation. The identified transactions are converted into a business value prioritized ranking based on non-functional requirements. Implementations further provide for identifying transaction specific code snippets in a monolithic application, the snippets including business logic for the selected transaction. In embodiments, the snippets are identified using static code analysis, dynamic transaction analysis, and its co-relation with use of primary tokens. Implementations further provide for mapping lines of code in a monolithic application to selected transaction operations (e.g. modify, create etc.). In embodiments, the mapping is achieved by identifying secondary tokens and using an affinity model to associate lines of code to selected transactions and operations in iterative mode. Implementations further provide for machine learning based definition of target state design including microservices and integrations that decouple a transaction from monolith system, including lines of code that are related to the microservice realization.

Aspects of the invention thus are useful to provide a method for transforming portions of a monolithic application into one or more microservices, the method comprising: identifying transactions for transformation prioritized on business value; determining system of record specific lines of code that are associated with the identified transactions; applying a token affinity model to map lines of code to a transaction and its operations, for the identified transactions; and defining a target state design which decouples the transaction from the system of record into a microservice application.

Aspects of the invention improve the functioning of a computing device by transforming certain transactions of a monolithic application into microservices. As but one example, implementations of the invention reduce the overall size of a monolithic application by slicing out certain functions of the monolithic application and having these functions performed by new microservices. As a result, the monolithic application will load faster, which itself is an improvement in the functioning (e.g., speed) of the computing device running the monolithic application. Aspects of the invention also have the practical application of changing how a monolithic application operates. For example, implementations of the invention reduce the number of functions performed by the monolithic application by offloading some of these functions to microservices. Aspects of the invention also generate new data that does not already exist in the system, and use this new data in subsequent steps.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
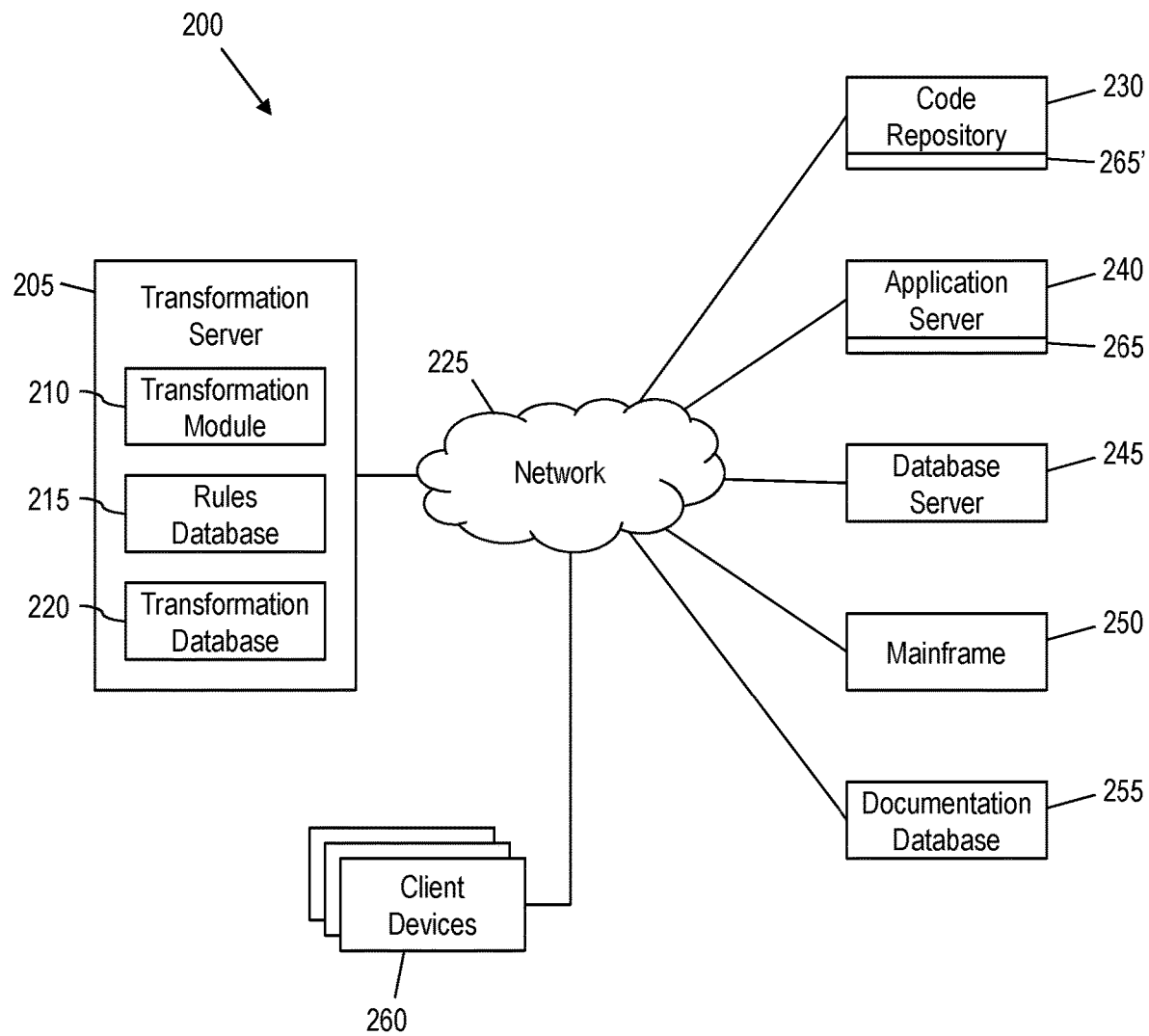
FIG. 2 shows a block diagram of an exemplary environment in accordance with aspects of the invention.

FIG. 2 shows a block diagram of an exemplary environment 200 in accordance with aspects of the invention. In embodiments, the environment includes a transformation server 205 running a transformation module 210. In embodiments, the transformation server 205 is a computing device, a virtual machine, or a container. When the transformation server 205 is implemented as a computing device, it may comprise one or more physical computing devices that include one or more elements of computer system 12 of FIG. 1, for example. When the transformation server 205 is implemented as a virtual machine, it may comprise one or more Java virtual machines (JVM), for example. When the transformation server 205 is implemented as a container, it may comprise one or more Docker containers, for example. The terms "Java" and "Docker" may be subject to trademark rights in various jurisdictions throughout the world and are used here only in reference to the products or services properly denominated by the marks to the extent that such trademark rights may exist.

In accordance with aspects of the invention, the transformation module 210 is configured to transform portions of an existing monolith application into microservices applications. In embodiments, the transformation module 210 accomplishes this transforming by performing the processes described herein including: identify and rank candidate transactions of an application; determine specific lines of code of the application associated with the identified transactions; map lines of code of the application to a transaction and its operation for the identified transactions; and define a target state design that decouples the transaction from the application and into a microservice application. In an exemplary implementation, the transformation module 210 comprises one or more program modules, such as program module 42 of FIG. 1.

In accordance with further aspects of the invention, the transformation server 205 comprises (or communicates with) a rules database 215 and a transformation database 220. In embodiments, the rules database 215 stores configurable rules that are used by the transformation module 210 to identify and rank transactions associated with an application, and the transformation database 220 stores data generated by the transformation module 210 in performing the processes described herein.

With continued reference to FIG. 2, the transformation server 205 is operatively connected to a network 225. In embodiments, the network 225 comprises one or more computer networks, such as one or more of a LAN, WAN, and the Internet.

Still referring to FIG. 2, other computing devices are also operatively connected to the network 225. These other computing devices may include at least one of: a code repository 230; an application server 240; a database server 245; a mainframe 250; a documentation database 255; and client devices 260. In an exemplary embodiment, the application server 240 runs a monolithic application 265 that is a single-tiered software application in which the user interface and data access code are combined into a single program from a single platform. In this example, the monolithic application 265 functions to: receive requests from the client devices 260; create, retrieve, update, or delete data stored in the database server 245 in response to the requests; and serve content to the client devices 260. In this example, application code 265' that is a high level language copy of the application 265 is stored in the code repository 230. In a particular implementation of this example, the application server 240 is a web server, and the monolithic application 265 is a website application that serves content to client devices 260 that are accessing a website hosted by the web server.

According to aspects of the invention, the transformation server 205 is configured to transform certain transactions performed by the monolithic application 265 into microservices. Microservices architecture is a methodology that breaks up an application into plural different services (e.g., microservices) that each perform a very specific process of the application. Microservices operate by making calls to one another and receiving responses to those calls. For example, a typical microservices architecture comprises plural microservices applications that run on HTTP servers and that communicate with one another using RESTful APIs (application program interfaces). Microservices that are used collectively in an application are independent from one another such that any one of the microservices can be changed without changing the others and without having to change the entire application. Prior to microservices, even the smallest change to a monolithic application (such as monolithic application 265) required changing and re-deploying the entire application.

In accordance with aspects of the invention described herein, the transformation server 205 is configured to identify plural different transactions that are performed by the monolithic application 265, rank these transactions using pre-defined rules, and transform one or more of the highest ranking transactions into microservices by isolating and decoupling the individual transactions from the monolithic application 265 and refactoring them into microservice applications. In this manner, implementations of the invention provide a targeted process of transforming only a subset of all the transactions performed by the monolithic application 265, the subset being determined based on predefined rules that rank transactions according to configurable criteria.

Figure 3:
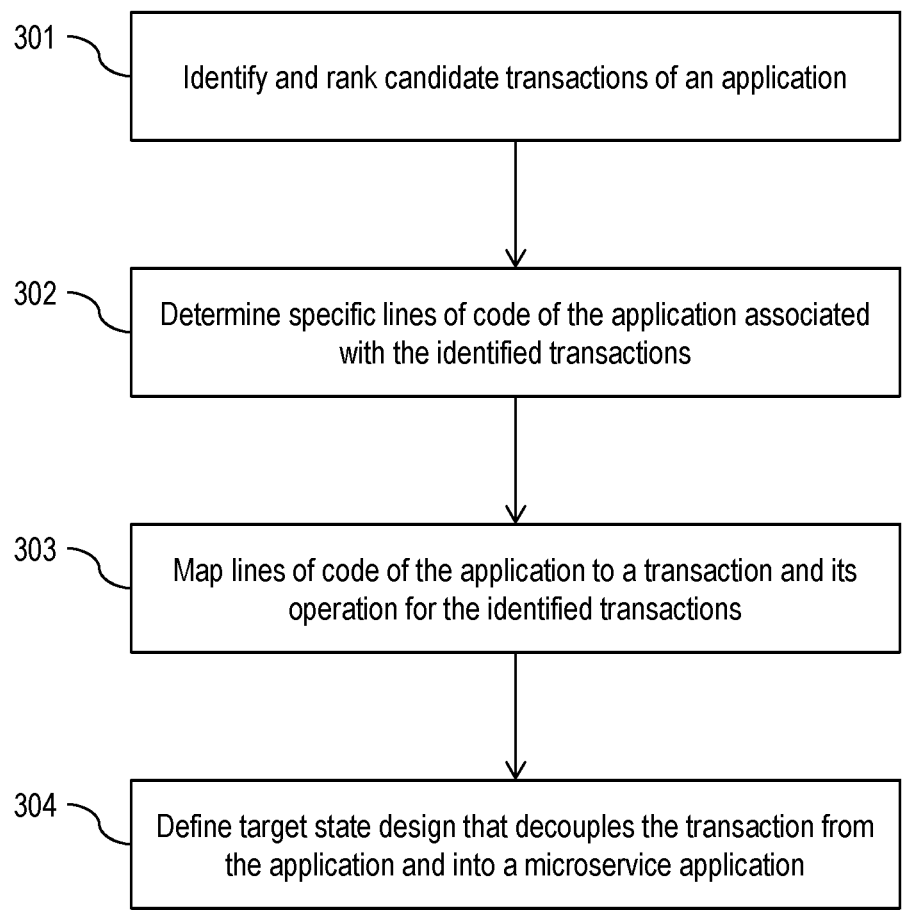
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 301, the system (e.g., the transformation module 210 of the transformation server 205) identifies and ranks candidate transactions of an application (e.g., the application 265). An exemplary implementation of step 301 is described herein at FIG. 4.

At step 302, the system determines specific lines of code of the application associated with the identified transactions (from step 301). An exemplary implementation of step 302 is described herein at FIG. 5.

At step 303, the system maps lines of code of the application to a transaction and its operation for the identified transactions. An exemplary implementation of step 303 is described herein at FIG. 6.

At step 304, the system defines a target state design that decouples the transaction from the application and into a microservices application. An exemplary implementation of step 304 is described herein at FIG. 7.

Figure 4:
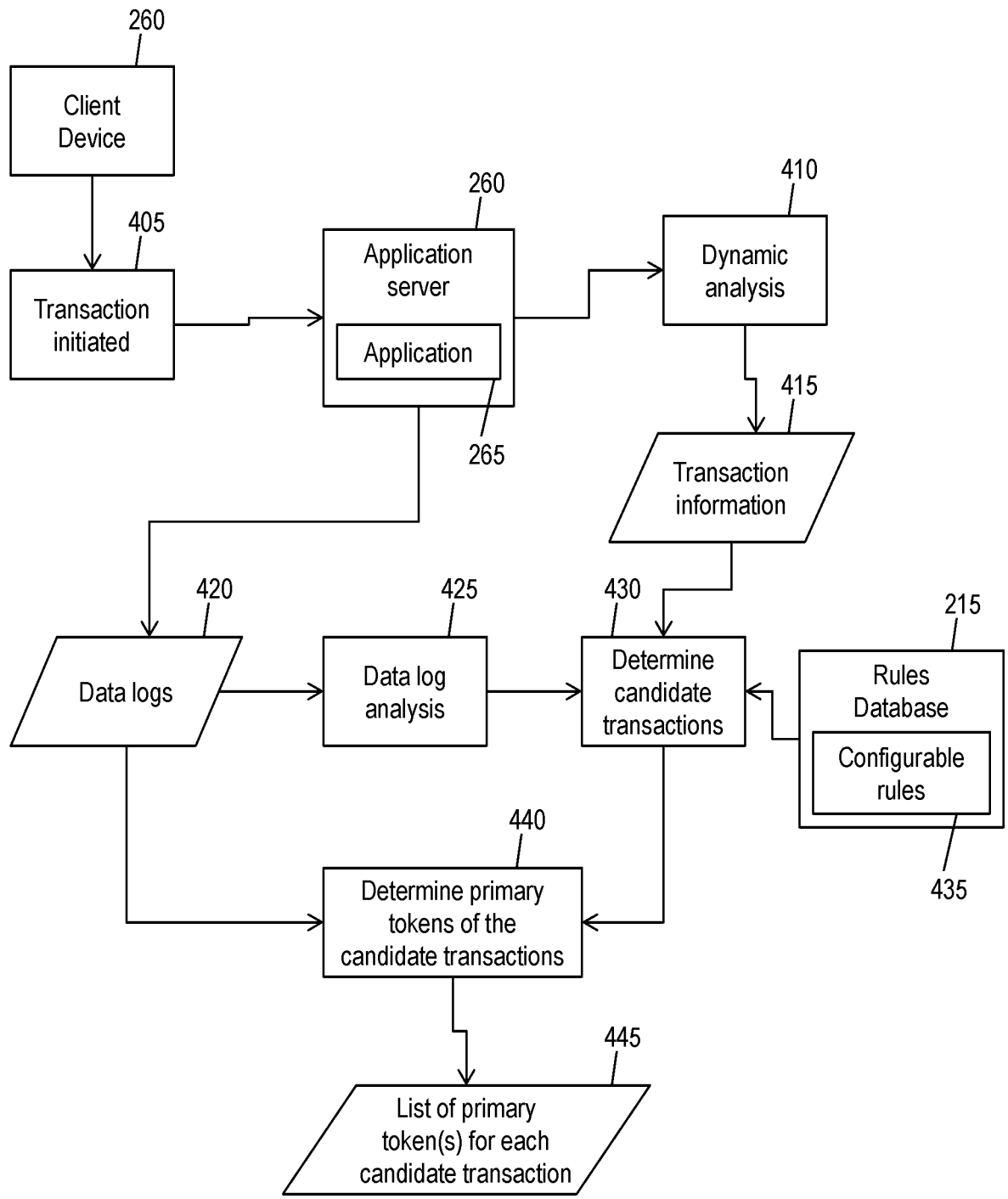
FIG. 4 shows a block diagram illustrating an exemplary implementation of a step of a method in accordance with aspects of the invention.

FIG. 4 shows a block diagram illustrating an exemplary implementation of step 301. Steps described in FIG. 4 may be carried out in the environment of FIG. 2 and are described with reference to elements depicted in FIG. 2. In embodiments, step 301 comprises performing dynamic analysis on the application run-time to identify top candidate transactions for transforming from the monolithic application 265 to microservices based on determined business value. In embodiments, step 301 includes the system determining a ranking of identified transactions in terms of value each transaction is predicted to generate.

As shown in FIG. 4, the client devices 260 initiate transactions with the application 265 running on the application server 240, as indicated at block 405. The transaction at block 405 may comprise, in one example, a transaction that the application 265 performs in response to input from the client device, such as a click at a website hosted by the application 265. As part of step 301 and as indicated at block 410, the transformation server 205 performs end-to-end transaction analysis of the application 265 during each such transaction, the analysis being performed using one or more application operations tools (e.g., DevOps tools such as tracing software that utilizes monitoring and logging to record information about a program's execution) to identify the flow of the transaction from the application server 240 to back-end systems. The dynamic analysis performed at block 410 provides transaction information 415 about each transaction, the transaction information including but not limited to: application layer information; services used by the application 265 during the transaction; origin; business function to process; connected methods; throughput; execution time; DB (database) tracing; locking state and periods; and DB operation type.

In embodiments, in addition to performing dynamic analysis using DevOps tools at block 410, step 301 further comprises the transformation server 205 monitoring and analyzing data logs 420 that store data associated with operation of the transaction. Logs are understood by those of ordinary skill in the art and as used herein may include, for example, at least one of: one or more logs generated on the application server 240; one or more logs generated on a web server; and one or more logs generated on a database server. In one aspect, as indicated at block 425, the transformation module 210 is configured to analyze the data in the logs 420 to determine factors such as: execution time for the transaction; locking information for the transaction; and queuing time for the transaction. In embodiments, the transaction operations used in a webservice are used to identify scenarios that are read versus write/update/delete, and the system uses this data to generate a report on the percentage of transactions that are read only.

Still referring to FIG. 4, in embodiments, step 301 includes the transformation module 210 determining one or more candidate transactions based on the transaction information 415, the log analysis 425, and configurable rules 435, as indicated at block 430. In accordance with aspects of the invention, the configurable rules 435 are predefined rules that are configurable by a user and that are used by the system to determine a value (e.g., a business value) of each transaction performed by the application 265. In embodiments, each one of the rules 435 is a scoring function (e.g., algorithm) that is based on at least one parameter of the transaction information 415 and/or the results of the log analysis 425.

One example of a rule 435 is to provide relatively a higher value (e.g., score) to transactions that have a longer wait time (e.g., execution time greater than a threshold value, e.g., 2 seconds) during a peak time of the application 265 compared to transactions that do not have a longer wait time (e.g., execution time less than the threshold value, e.g., 2 seconds) during the peak time of the application 265. Another example of a rule is to provide a relatively higher value (e.g., score) to transactions that time out waiting for a response from the application 265 compared to transactions that do not time out waiting for a response from the application 265. Another example of a rule is to provide a relatively higher value (e.g., score) to transactions that are read only, compared to transactions that are create (write), update, or delete. Another example of a rule is to provide a relatively higher value (e.g., score) to transactions in which the percent of read operations (compared to all operations of this transaction) is higher than a threshold number (e.g., by a threshold amount, such as 60% higher) compared to transactions in which the percent of read operations is not higher than a threshold number. These examples are not limiting, and other types of rules and different numbers of rules may be used in implementations of the invention. In embodiments, the transformation server 205 uses the rules 435 to generate a ranked list of all the transactions of the application 265, the list being ranked according to the value (e.g., score) of each transaction as determined using one or more of the rules 435.

According to aspects of the invention, the system determines a set of candidate transactions based on the ranked list of all the transactions, the set of candidate transactions being a subset of less than all the transactions. In embodiments, the set of candidate transactions is determined using any suitable business rule that is configurable in the transformation module 210. One example is to deem that a candidate transaction is any transaction having a ranked value (e.g., score as determined by the rules) that exceeds a threshold value. Another example is to deem that the top 5% of the ranked transactions are the candidate transactions. These are just two examples, and other types of logic may be used to determine the candidate transactions from the ranked list of all the transactions. In embodiments, the transformation module 210 provides a user interface that permits the user to provide input that defines one or more business rules that are used by the transformation module 210 to determine the set of candidate transactions from the ranked list of all the transactions in this manner.

Although plural candidate transactions may be determined at block 430, the remainder of the description herein refers to a single one of the candidate transactions for simplicity. It is understood, though, that the processes that are described for the single one of the candidate transactions may be repeated for other ones of the plural candidate transactions determined at block 430.

With continued reference to FIG. 4, at block 440 the transformation module 210 analyzes the data logs 420 to identify one or more primary tokens associated with a candidate transaction that was identified at block 430. In embodiments, the transformation module 210 extracts a list of primary tokens from logs generated for the candidate transaction. As used herein, a primary token refers to a change in a data log 420 that was caused by the candidate transaction of the application 265. In some implementations, the transformation module 210 detects a change in any one of the logs 420 by comparing the data of the log prior to the transaction to the data of the log after the candidate transaction, and uses this comparison to identify data that was changed in the log as a result of the candidate transaction. In one example, the primary token comprises a string that was added to or changed in the log 420, although other types of changes to the log 420 may be used as a primary token. The output of the analysis at block 440 is data defining a list of one or more primary tokens for this candidate transaction, as indicated at block 445.

Figure 5:
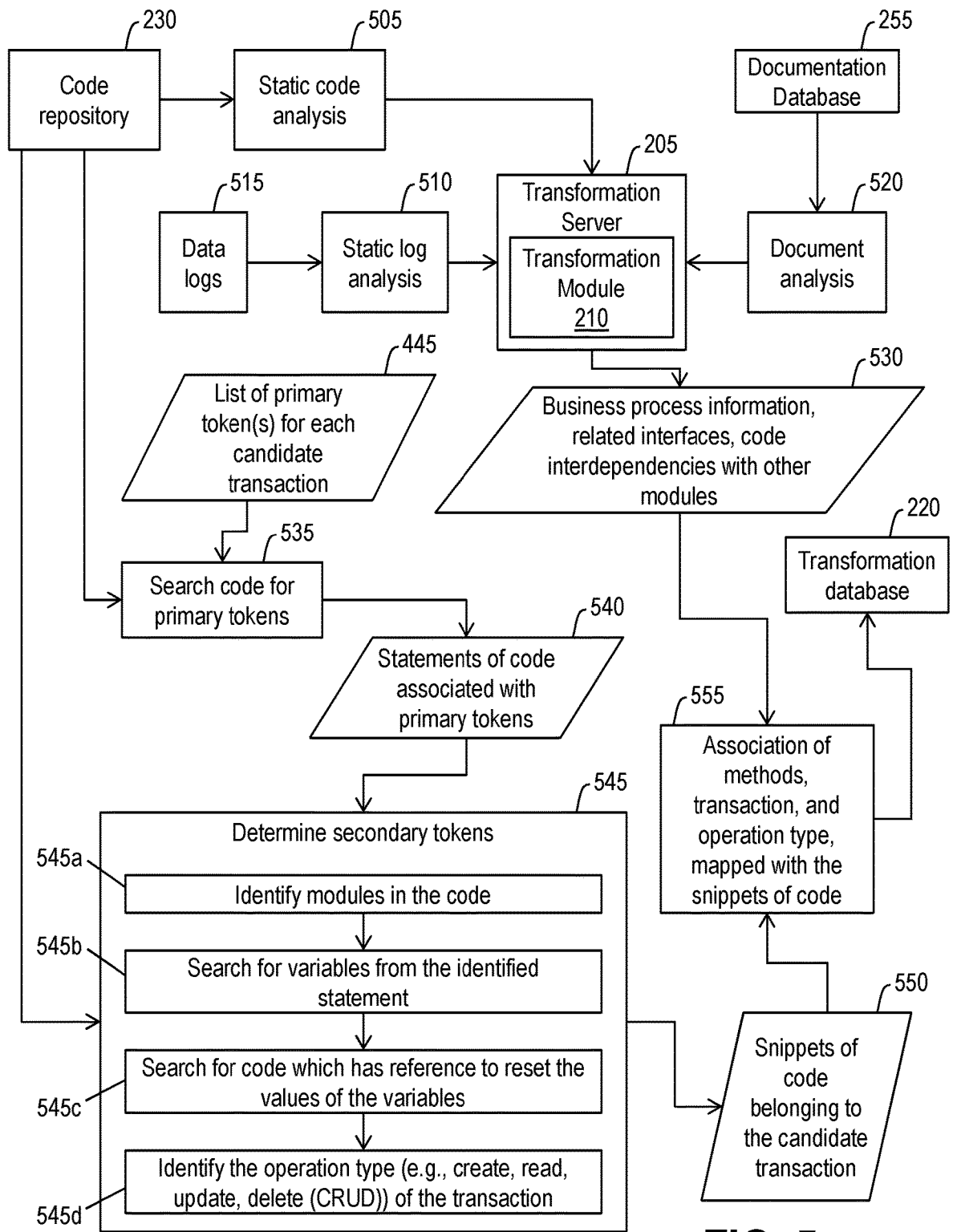
FIG. 5 shows a block diagram illustrating an exemplary implementation of a step of a method in accordance with aspects of the invention.

FIG. 5 shows a block diagram illustrating an exemplary implementation of step 302. Processes described in FIG. 5 may be carried out in the environment of FIG. 2 and are described with reference to elements depicted in FIG. 2. In embodiments, step 302 comprises the transformation module 210 performing static analysis on the application code 265' stored in the code repository 230 to determine the module, related interface, and other parameters of the application. In embodiments, step 302 further comprises the transformation module 210 searching for a secondary token mapped with the operation type (e.g., one of create, read, update, and delete, referred to as CRUD) in the application code 265'.

As indicated at block 505, the transformation module 210 performs static analysis of the application code 265' (e.g., the source code in a resting state) of the application 265. In embodiments, the static analysis is performed on modules that were identified in the dynamic analysis (at block 410), and may be performed used conventional static code analysis software tools.

At block 510, the transformation module 210 performs static analysis of the logs 515 available at various devices that interact with the application 265, such as one or more logs of the application server, one or more logs of a web server, one or more logs of a database server. In some embodiments, the logs at 515 may be the same logs that are represented at block 420. In embodiments, the static analysis of the logs 515 is used to determine the usage (e.g., in volume) of the methods of the application 265.

At block 520, the transformation module 210 analyzes document data associated with the application 265. The document data may be stored at the documentation database 255. In embodiments, the document analysis comprises a cognitive analysis of the document data, using natural language processing for example, to determine information about various business functions of the application 265.

According to aspects of the invention, at block 525, the transformation module 210 analyzes the results of the static code analysis (of block 505), the results of the static log analysis (of block 510), and the results of the document analysis (of block 520) to determine code information 530 including at least one of: business process information of the application 265, related interfaces of the application 265, and code interdependency with other modules of the application 265.

With continued reference to FIG. 5, at block 535 the transformation module 210 analyzes the application code 265' for the primary tokens included in the list 445 determined at step 301. In one example, the transformation module 210 searches the application code 265' for any strings included in the primary tokens. The output of this analysis is one or more statements of the application code 265' that are associated with the primary tokens, as represented at block 540. For example, a statement in this context may comprise a line, or lines, of the application code 265' that created the primary token.

At block 545, the transformation module 210 determines one or more secondary tokens associated with the candidate transaction. In embodiments, secondary tokens are variables in the lines of code associated with the primary tokens, as determined at step 540. In one example, step 545 includes steps 545a-d as depicted in FIG. 5. At step 545a, the transformation module 210 identifies the module or modules of the application code 265' that include the primary tokens. This may be performed using conventional software tools, such as the High Level Assembler Program Understanding Tool (ASMPUT) that analyzes assembler language programs, and displays analyzed source code and the corresponding control flow graph. At step 545b, the transformation module 210 searches the application code 265' for variables in the identified modules (from step 545a). In embodiments, the variables found in the identified modules are deemed to be the secondary tokens, and correspond to the variables that affect a primary token that corresponds to a change in a log caused by the candidate transaction. As such, the variables identified in this manner are deemed relevant to the candidate transaction. At step 545c, the transformation module 210 searches the application code 265' for any references to the variables that were identified at step 545b. These portions of the code that have a reference to the variables are also deemed to be relevant to the candidate transaction, since these portions of the code can affect the variables, which can affect a primary token that corresponds to a change in a log caused by the candidate transaction. At step 545d, the transformation module 210 identifies the operation type of the candidate transaction as one of (e.g., one of create, read, update, and delete (CRUD)).

With continued reference to FIG. 5, the output of step 545 is represented at block 550 and includes one or more snippets of the application code 265' that are determined to be associated with the candidate transaction (via the primary tokens and secondary tokens), in addition to an operation type of the transaction (e.g., one of CRUD).

At step 555, the transformation module 210 maps the snippets of code (from step 550) with the code information 530 that was determined using the analysis steps 505, 510, and 520. The output of this mapping is stored (e.g., in the transformation database 220) for use in subsequent steps.

Referring collectively to FIGS. 4 and 5, in some embodiments, the transformation module 210 uses machine learning to assist in identifying the primary tokens and/or secondary tokens. In some implementations, the transformation module 210 may be used to analyze plural different monolithic applications in the manner described herein, to receive feedback (e.g., from users) indicating a degree of success or failure with respect to the determined primary tokens and/or secondary tokens, and to use this feedback in a machine learning algorithm that affects how the system determines the primary tokens and/or secondary tokens in subsequent iterations. For example, based on positive and/or negative feedback, the system may use machine learning to learn that certain types of changes to certain types of data logs are relatively strong (e.g., good) or relatively weak (e.g., bad) indicators of a primary token, and may use this learning to adjust the algorithm that is used to identify primary tokens in subsequent iterations. In another example, based on positive and/or negative feedback, the system may use machine learning to learn that certain types of references of code portions to variables (e.g., a secondary token) are relatively strong (e.g., good) or relatively weak (e.g., bad) indicators of a snippet of code that should be associated with the transaction, and may use this learning to adjust the algorithm that is used to identify primary tokens in subsequent iterations.

Figure 6:
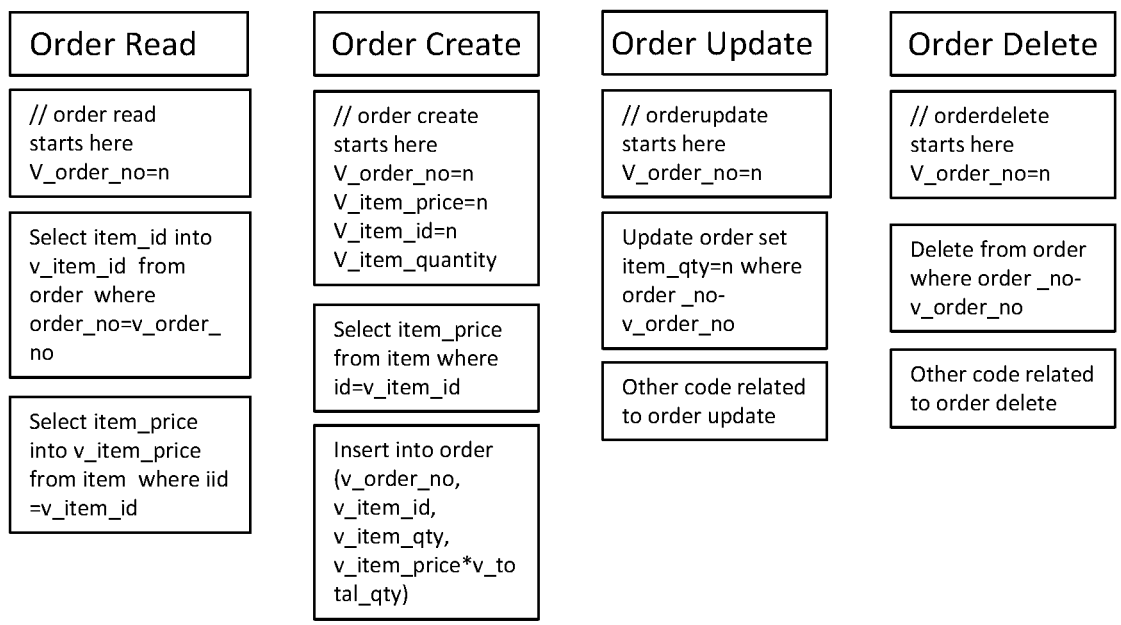
FIG. 6 shows an exemplary output of a step of a method in accordance with aspects of the invention.

FIG. 6 shows an exemplary output of step 303 in accordance with aspects of the invention. In embodiments, step 303 comprises the transformation module 210 using a token affinity model to identify specific lines of the application code 265' to be decoupled from the monolithic application and transformed to a microservices application. In implementations, the token affinity model is an algorithm that builds an association between specific lines of code to a microservice function with an associated operation type (e.g., CRUD). In this manner, the token affinity model establishes a relation of lines of code to a transaction based on proximity of the tokens in the model. In aspects, the token affinity model outputs a range of lines of code that are targeted for the candidate transaction and operation.

In a particular example, the token affinity model first plots a polygon with microservice functions as vertices. In this example, the token affinity model then plots line of associated code within the polygon area by matching primary and secondary tokens of a line of code to that microservice function. With the data plotted in this manner, the vertex closest to the line of code occurrences represents the strongest association of a line of code to the vertex (e.g., representing a microservice function). In embodiments, the transformation module 210 is programmed to run the token affinity model as described herein, using results from block 555 as inputs to the token affinity model.

FIG. 6 shows an exemplary output of the token affinity model for a candidate transaction (e.g., an "order" transaction) of the monolithic application 265. In particular, FIG. 6 shows that a read operation of the candidate transaction is performed by lines of code 605, that a create operation of the candidate transaction is performed by lines of code 610, that an update operation of the candidate transaction is performed by lines of code 615, and that an update operation of the candidate transaction is performed by lines of code 620, where lines 605, 610, 615, and 620 each correspond to lines of the application code 265' of the monolithic application 265.

Figure 7:
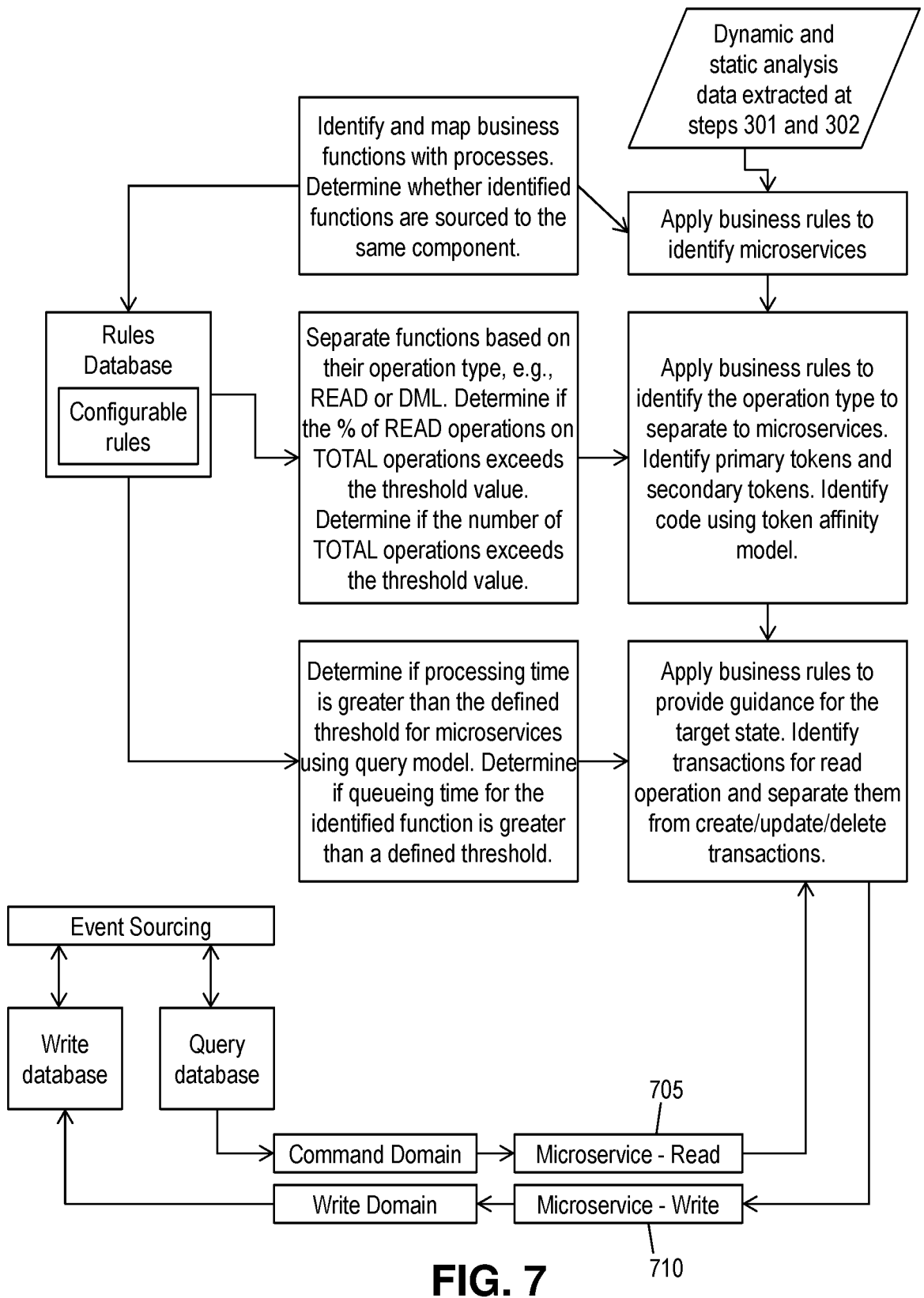
FIG. 7 shows a block diagram illustrating an exemplary implementation of a step of a method in accordance with aspects of the invention.

FIG. 7 shows a block diagram illustrating an exemplary implementation of step 304. Processes described in FIG. 7 may be carried out in the environment of FIG. 2 and are described with reference to elements depicted in FIG. 2. In embodiments, step 304 comprises defining a targeted state design for transforming certain operations of the candidate transaction to microservices.

In accordance with aspects of the invention, all the lines of code identified for the read operation of the candidate transaction are transformed to a first microservice, and all the lines of code identified for the create/update/delete operations of the candidate transaction are transformed into one or more second microservices that are separate from the first (read) microservice. Using the example from FIG. 6, in embodiments, the code 605 of the read operation is decoupled from the monolithic application and replaced with a first read microservice application 705 that performs the same read operation. Continuing this same example, the code 610, 615, 620 of the create/update/delete operations is decoupled from the monolithic application and replaced with one or more second write microservice applications 710 that perform the same create/update/delete operations. In embodiments, the data store for each microservice is identified by a listing entity and its attributes used in the candidate transaction, which is transformed for JSON format instead of RDBMS. As shown in FIG. 7, the read microservice application 705 is associated with the Command Domain of the CQRS pattern, and the one or more second write microservice applications 710 is associated with the Write Domain of the CQRS pattern. In this manner, the targeted state design is based on the CQRS pattern.

In implementations, step 304 comprises implementing the target state design by: modifying the application code of the monolithic application to omit the identified lines of code (e.g., code 605, 610, 615, 620); creating source code of the microservices applications (e.g., 705, 710); and redeploying the modified monolithic application concurrently with deploying the microservices applications.

As should be apparent from the description herein, implementations of the invention are usable to provide a method comprising: determine a list of transactions of a monolithic application; rank the transactions using configurable rules; select a candidate transaction from the ranked list; determine lines of application code of the monolithic application associated with create/read/update/delete (CRUD) operations of the transaction; define a target state design in which a first microservice performs the read operation and in which at least one second microservice performs the create/update/delete operations.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computing device, transactions of a monolithic application;
   ranking, by the computing device, the transactions using predefined rules;
   selecting, by the computing device, a candidate transaction from the ranked list based at least in part on the ranking of the transactions;
   determining, by the computing device, lines of application code of the monolithic application associated with the candidate transaction;
   receiving, by the computing device, feedback indicating certain types of changes to certain types of data logs as relatively strong or relatively weak indicators of a primary token;
   mapping, by the computing device, respective ones of the determined lines of application code to a first operation and a second operation, wherein the first operation and the second operation are different types of operation; and
   defining, by the computing device, a target state design that comprises a first microservice that performs the first operation and a second microservice that performs the second operation.

2. The method of claim 1, wherein the determining the lines of application code comprises:
   determining the primary token; and
   determining at least one secondary token based on the primary token.

3. The method of claim 2, wherein:
   the determining the primary token comprises determining a change in a data log caused by the candidate transaction; and
   the determining the at least one secondary token comprises: determining a portion of the application code associated with the primary token; and determining at least one variable in the determined portion of the application code.

4. The method of claim 3, wherein the mapping comprises using a token affinity model to determine a closeness of the respective ones of the determined lines of application code to the first operation and the second operation.

5. The method of claim 1, wherein:
   the first operation comprises a read operation; and
   the second operation comprises at least one of a create, update, and delete operation.

6. The method of claim 1, further comprising providing an interface by which a user provides input to configure the predefined rules in accordance with configurable criteria, wherein the ranking the transactions is based on the predefined rules according to the configurable criteria.

7. The method of claim 1, wherein:
   the determining the transactions comprises performing dynamic analysis of a runtime of the monolithic application; and
   the determining the lines of application code comprises performing a static analysis of the application code, a static analysis of logs, and a static analysis of documents associated with the monolithic application.

8. The method of claim 1, further comprising:
   using the feedback in a machine learning algorithm to adjust an algorithm that is used in the determining the primary token.

9. The method of claim 1, further comprising:
   receiving further feedback indicating certain types of references of code portions to variables as relatively strong or relatively weak indicators of a secondary token; and
   using the further feedback in a machine learning algorithm to adjust an algorithm that is used in the determining the at least one secondary token.

10. A computer program product comprising one or more computer readable storage media having program instructions collectively stored on the one or more computer readable storage media, the program instructions executable to:
    determine transactions of a monolithic application;
    rank the transactions using predefined rules;
    select a candidate transaction from the ranked list based at least in part on the ranking of the transactions;
    determine lines of application code of the monolithic application associated with the candidate transaction;
    receive feedback indicating certain types of references of code portions to variables as relatively strong or relatively weak indicators of at least one secondary token;
    map respective ones of the determined lines of application code to a first operation and a second operation, wherein the first operation and the second operation are different types of operation; and
    define a target state design including a first microservice that performs the first operation and a second microservice that performs the second operation.

11. The computer program product of claim 10, wherein:
    the determining the transactions comprises performing dynamic analysis of a runtime of the monolithic application; and
    the determining the lines of application code comprises: determining a primary token; determining the at least one secondary token based on the primary token; and performing a static analysis of the application code, a static analysis of logs, and a static analysis of documents associated with the monolithic application.

12. The computer program product of claim 11, wherein:
the determining the primary token comprises determining a change in a data log caused by the candidate transaction; and
the determining the at least one secondary token comprises: determining a portion of the application code associated with the primary token; and determining at least one variable in the determined portion of the application code,
wherein the mapping comprises using a token affinity model to determine a closeness of the respective ones of the determined lines of application code to the first operation and the second operation, wherein:
the first operation comprises a read operation; and
the second operation comprises at least one of a create, update, and delete operation,
wherein the program instructions are further executable to provide an interface by which a user provides input to configure the predefined rules.

13. A system comprising:
a processor, a computer readable memory, one or more computer readable storage media, and program instructions collectively stored on the one or more computer readable storage media, wherein the program instructions executable by the processor via the computer readable memory to:
determine transactions of a monolithic application;
predict a business value that a transformation of each of the transactions to microservices is predicted to deliver;
rank the transactions using predefined rules;
select a candidate transaction from the ranked list based at least in part on the ranking of the transactions;
determine lines of application code of the monolithic application associated with the candidate transaction;
map respective ones of the determined lines of application code to a first operation and a second operation, wherein the first operation and the second operation are different types of operation; and
define a target state design including a first microservice that performs the first operation and a second microservice that performs the second operation,
wherein the determining the lines of application code comprises: determining a primary token; and determining at least one secondary token based on the primary token.

14. The system of claim 13, wherein:
the determining the primary token comprises determining a change in a data log caused by the candidate transaction; and
the determining the at least one secondary token comprises: determining a portion of the application code associated with the primary token; and determining at least one variable in the determined portion of the application code.

15. The system of claim 14, wherein the mapping comprises using a token affinity model to determine a closeness of the respective ones of the determined lines of application code to the first operation and the second operation, wherein:
the first operation comprises a read operation; and
the second operation comprises at least one of a create, update, and delete operation,
wherein the program instructions are further executable to provide an interface by which a user provides input to configure the predefined rules.

16. The method of claim 1, wherein the target state design is based on CQRS (Command Query Responsibility Segregation).

17. The method of claim 1, further comprising implementing the target state design, wherein implementing the target state design comprises:
creating source code of the first microservice and the second microservice; and
deploying the first microservice and the second microservice.

18. The method of claim 17, further comprising:
modifying the application code of the monolithic application to omit the identified lines of code; and
redeploying the modified monolithic application concurrently with the deploying the first microservice and the second microservice.

19. The method of claim 1, further comprising:
predicting a business value each of the transactions is to generate, based at least in part on non-functional requirements, that a transformation of the transactions to microservices is predicted to deliver,
wherein the ranking the transactions comprises providing a prioritized ranking of the transactions based at least in part on the business value each of the transactions is predicted to generate.

20. The method of claim 4, wherein using the token affinity model comprises:
plotting a polygon with microservice functions as vertices;
plotting one or more lines of associated code within the polygon area by matching primary and secondary tokens of the one or more lines of code to that micro service function; and
identifying a vertex closest to the line of code as representing a strongest association of the line of code to the vertex representing a microservice function.

* * * * *